(No Model.)
2 Sheets—Sheet 1.

W. & C. L. CAIRNS.
CONFECTIONER'S KETTLE.

No. 377,144. Patented Jan. 31, 1888.

Witnesses:
J. Staib
Chas. H. Smith

Inventors
William Cairns
Charles L. Cairns
per Lemuel W. Serrell
atty

N. PETERS, Photo-Lithographer, Washington, D. C.

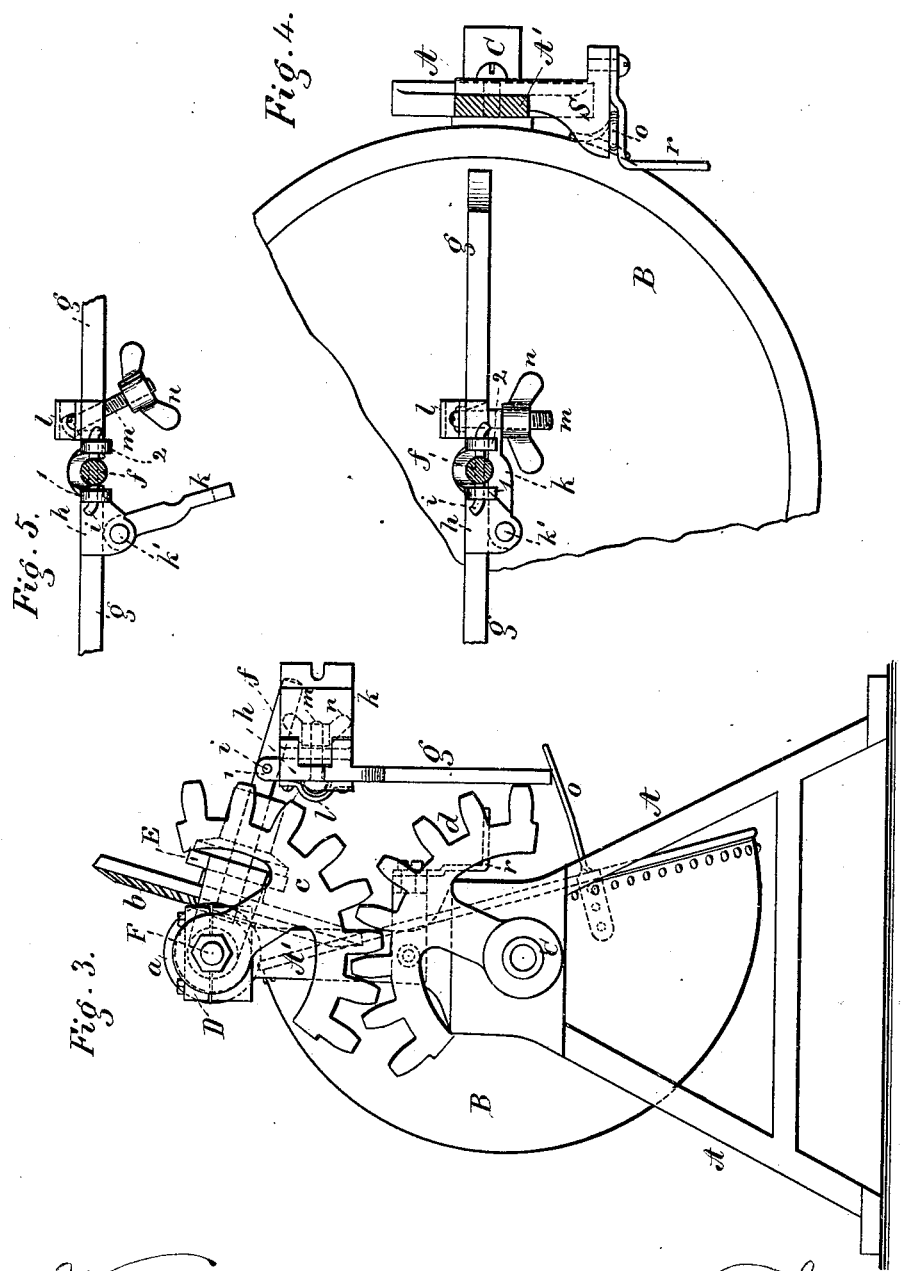

UNITED STATES PATENT OFFICE.

WILLIAM CAIRNS AND CHARLES L. CAIRNS, OF JERSEY CITY, NEW JERSEY.

CONFECTIONER'S KETTLE.

SPECIFICATION forming part of Letters Patent No. 377,144, dated January 31, 1888.

Application filed May 13, 1887. Serial No. 238,080. (No model.)

*To all whom it may concern:*

Be it known that we, WILLIAM CAIRNS and CHARLES L. CAIRNS, of Jersey City, in the county of Hudson and State of New Jersey, have invented a new and useful Improvement in Confectioners' Kettles; and the following is declared to be a description of the same.

Confectioners' kettles as heretofore constructed have been provided with a steam-jacket and have been mounted in bearings by trunnions or hollow shafts, through which the steam passed into the jacket, and the mixing of the contents was done by hand. Other kettles have been made in which a mechanical stirrer was employed; but in this case the kettle was stationary and the stirrer raised and lowered.

The object of our invention is to provide a steam-jacketed kettle having a mechanical stirrer which shall be capable of being tipped to deliver its contents, and to this end we combine with the usual steam-jacketed kettle mechanical devices whereby the kettle can be quickly tipped to deliver its contents, the stirrer being at the same time swung out of the way.

We provide a frame rising above the supporting-frame of the kettle, and this frame carries a yoke and cross-shaft. The shaft and yoke carry bevel-wheels and a vertical shaft, to which the stirrer is connected, and said shaft has upon one end a fast and loose pulley for power and upon the other end a segmental gear, which meshes with a similar gear upon the trunnion of the kettle. The stirrer is pivotally connected to its upright shaft and adjustably clamped thereto, and there is an upright arm upon one side of the kettle and a bracket and swinging arm upon the frame, by means of which the kettle is held in place or can be released and tipped for the discharge of its contents.

Figure 1:
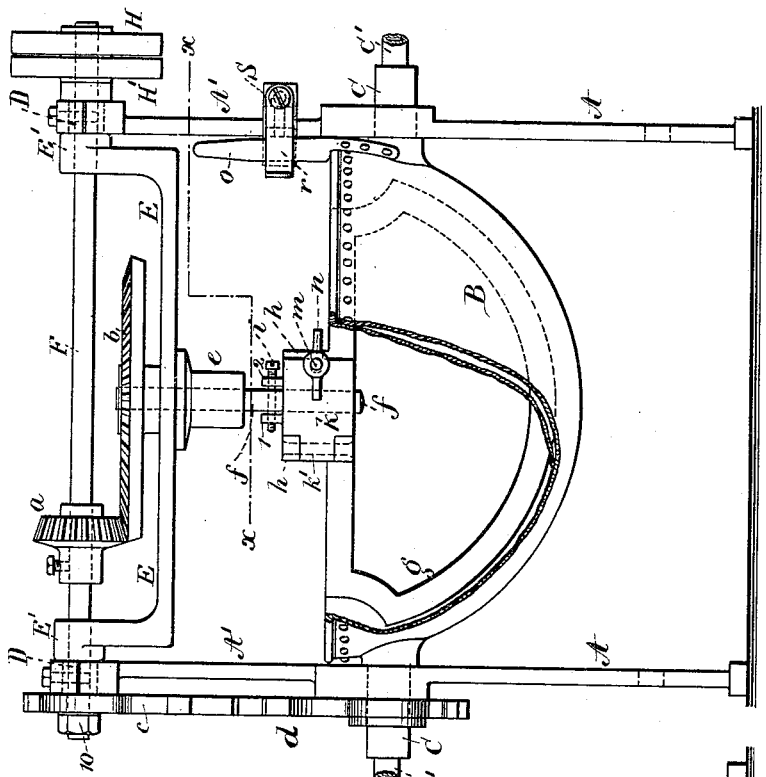
Figure 2:
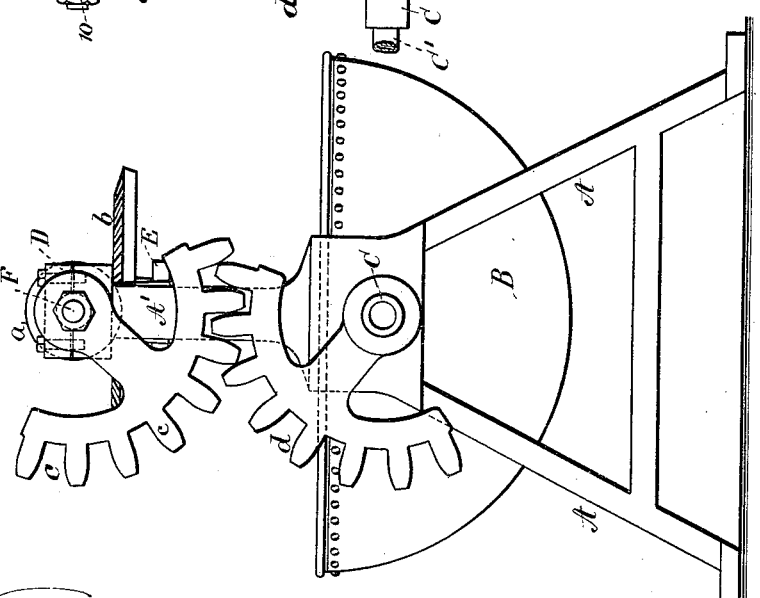

In the drawings, Figure 1 is an elevation of our improved kettle with a portion of the kettle removed to show the stirrer. Fig. 2 is an end view of the same. Fig. 3 is an end view of the kettle and stirrer in a tipped position. Fig. 4 is a partial plan view of the kettle, stirrer, and securing-arms below the section-line $x\ x$ of Fig. 1; and Fig. 5 is a sectional plan of the device for securing and connecting the stirrer to its shaft.

A represents the supporting-frame, B the steam-jacketed confectioner's kettle, C the trunnions for supporting the same, and C' the inlet and exit steam-pipes, which parts, being well known, do not require further description.

The standards A' are formed with and rise above the frames A, and there are bearing-boxes D at the upper ends of these standards.

The yoke E has hubs E' at its ends, which are supported in the bearings D, and the shaft F passes freely through these hubs, and upon one end of said shaft are the fast and loose driving-pulleys H H', and upon the other end of said shaft there is a nut, 10, and upon one hub E' of the yoke there is a segmental gear, $c$, which meshes with a corresponding segmental gear, $d$, upon one of the trunnions of the kettle B. The nut 10 bears against one sleeve E' to keep the shaft F in place.

The yoke E has a central hub, $e$, and through said yoke and hub the vertical shaft $f$ passes, and the bevel-wheel $b$ is secured to the shaft $f$, and it meshes with the bevel-wheel $a$ upon the shaft F.

The stirrer $g$ corresponds in shape to the half-round kettle B, and the upper horizontal arm of said stirrer has a rising plate, $h$, whose face is grooved to receive the shaft $f$, and upon whose upper surface there are lugs 1 2, and a pin or screw, $i$, passes through said lugs and the shaft $f$, so as to pivotally connect the shaft to the stirrer, for a purpose hereinafter explained. The front plate, $k$, is hinged at $k'$ to the plate $h$, and its inner face is grooved to receive the shaft $f$, and its outer edge is slotted to receive the screw-stem $m$, which carries the clamping-nut $n$. This screw-stem $m$ passes through the plate $h$, and its end is headed and covered by a yoke, $l$, and the stirrer is held rigidly to the shaft $f$ by bringing the plates $h$ and $k$ close together at opposite sides of said shaft and clamping them with the nut $n$, as in Fig. 4. When the nut $n$ is loosened, and it and the stem $m$ swung to one side, the plate $k$ is free to swing out into the position shown in Figs. 3 and 5, which permits the stirrer to be lifted out of the kettle, as hereinafter described.

The bracket s is formed with and extends out from one of the standards A', and the bent swinging arm r is pivoted to this bracket s, and secured to the upper edge of the kettle B is a vertical stationary arm, o. In the position shown in Figs. 1, 2, and 4, the arm o is received and held between the arm r and face of the bracket s, and the kettle cannot be moved or tilted.

The shaft F and bevel-wheel a are revolved by the pulley H, and they in turn revolve the bevel-wheel b, shaft f, and stirrer g, the other parts remaining stationary, and thus the contents of the kettle B are worked up into the desired condition.

When it is desired to tilt the kettle and deliver its contents, the driving-belt is shifted to the loose pulley H' and the stirrer stopped. The nut n is now loosened and the nut and screw-stem m moved aside and the plate k swung out into the position shown in Fig. 5. The arm r is now swung over, releasing the arm o, which is grasped and employed to tilt the kettle into the position shown in Fig. 3.

As the kettle is tilted by the arm o, the segmental gear d upon its trunnion is moved, and it operates the corresponding gear, c, causing the yoke E, gear b, and shaft f to be swung outward and upward into the position shown in Fig. 3, thus lifting the stirrer perpendicularly out of the kettle and permitting the contents of the kettle to be discharged freely. As the kettle is returned to a horizontal position, and the yoke, gear-shaft, and stirrer swung down into their normal position, the stirrer is connected, as before described, to the shaft f, and the arm o is secured behind the arm r, and the parts are in condition for the operations to be repeated.

We claim as our invention—

1. The combination, with the kettle B, stirrer g, and supporting-frames, of the yoke E, segmental gears c d, an operating-shaft, F, bevel-wheels a b, shaft f, plates h k, between which the shaft f is held, lugs and a pin for connecting the shaft f to the stirrer, and a screw-stem, m, and clamping-nut n, substantially as specified.

2. The combination, with the kettle B, stirrer g, and supporting-frames, of segmental gears c d, connecting the yoke and kettle-trunnions, respectively, an operating-shaft, F, a shaft, f, wheels for transmitting power from the shaft F to shaft f, and means, substantially as specified, for connecting the shaft f and stirrer g and for securely clamping them together, substantially as set forth.

3. The combination, with the kettle B, its trunnions and supporting-frames, and the stirrer g, of a yoke, E, having upturned ends and hubs by which said yoke is suspended in the frames, and a shaft, F, passing through said hubs, a shaft for rotating the stirrer and supporting the same from the yoke, and segmental meshing gears c d, connected, respectively, to one hub of the yoke and one trunnion of the kettle, whereby the tilting of the kettle swings the yoke and stirrer-shaft out of a perpendicular line, substantially as specified.

4. The combination, with the kettle B, its trunnions and supporting-frames, and the stirrer g, of a yoke, E, having upturned ends and hubs by which said yoke is suspended in the frames, and a shaft, F, passing through said hubs, a shaft depending from the yoke for rotating the stirrer, a joint for supporting the stirrer from the shaft, plates and a clamping-nut for rigidly holding the shaft and stirrer together, and segmental meshing-gears c d, connected, respectively, to one hub of the yoke and one trunnion of the kettle, whereby the tilting of the kettle swings the yoke and stirrer-shaft out of a perpendicular line, while the stirrer hangs vertically as the contents of the kettle are discharged, substantially as specified.

5. The combination, with the stirrer g, shaft f, and means, substantially as specified, for operating the same, of lugs and a pin for connecting the stirrer to the shaft, plates between which the shaft f is clamped, and a clamping-nut for holding said plates together, substantially as set forth.

Signed by us this 10th day of May, A. D. 1887.

WM. CAIRNS.
CHARLES L. CAIRNS.

Witnesses:
GEO. T. PINCKNEY,
HAROLD SERRELL.